United States Patent [19]
Urban

[11] 3,859,414

[45] Jan. 7, 1975

[54] REMOVAL OF $H_2S$ FROM A GAS STREAM CONTAINING $H_2S$ AND $CO_2$

[75] Inventor: Peter Urban, Northbrook, Ill.

[73] Assignee: Universal Oil Products Company, Des Plaines, Ill.

[22] Filed: Jan. 15, 1973

[21] Appl. No.: 323,613

[52] U.S. Cl............................ 423/222, 423/514
[51] Int. Cl...................... C01b 17/16, C01b 31/70
[58] Field of Search ............... 423/222, 514; 55/73

[56] References Cited
UNITED STATES PATENTS

| | | | |
|---|---|---|---|
| 1,639,905 | 8/1927 | Sperr et al. | 423/514 |
| 1,819,658 | 8/1931 | Sperr | 423/514 |
| 3,764,653 | 10/1973 | Urban | 423/514 |

FOREIGN PATENTS OR APPLICATIONS

| | | | |
|---|---|---|---|
| 197,898 | 5/1923 | Great Britain | 423/514 |

Primary Examiner—Oscar R. Vertiz
Assistant Examiner—Eugene T. Wheelock
Attorney, Agent, or Firm—James R. Hoatson, Jr.; Thomas K. McBride; William H. Page, II

[57] ABSTRACT

$H_2S$ is removed from a gas stream containing $H_2S$ and $CO_2$ without essentially affecting the $CO_2$ content of the gas stream by contacting the gas stream, in an absorption zone, with an aqueous absorbent stream containing a water-soluble sulfite compound at thiosulfate production conditions, including a pH selected from the range of about 6 to about 7, selected to form a treated gas stream substantially reduced in $H_2S$ content and a rich absorbent stream which contains a thiosulfate compound and which is substantially free of elemental sulfur. Key feature of the disclosed method involves the careful selection of conditions in the scrubbing step to avoid the formation of elemental sulfur and to allow the selective production of a thiosulfate product.

13 Claims, No Drawings

REMOVAL OF H₂S FROM A GAS STREAM CONTAINING H₂S AND CO₂

The subject of the present invention is a method for selectively removing $H_2S$ from a gas stream containing $H_2S$ and $CO_2$ without forming any substantial amounts of elemental sulfur and without affecting the $CO_2$ content of the input gas stream. More specifically, the present invention involves a method for operating an $H_2S$ scrubbing step with an input gas stream containing both $H_2S$ and $CO_2$ wherein a relatively inexpensive and widely available oxidizing agent is used to selectively react with absorbed $H_2S$ to produce the corresponding thiosulfate compound without the formation of an elemental sulfur by-product and without affecting the $CO_2$ content of the gas stream. The oxidizing agent involved here is a water-soluble sulfite compound and the principal means for achieving these desired results is the operation of the scrubbing step under conditions selected to form thiosulfate, the most important of which involves a critical limitation on the pH of the absorbent solution when it enters the scrubbing zone. The critical pH range is about 6 to about 7. The dominant effect of operating below this range is to contaminate the rich absorbent solution with elemental sulfur. On the other hand, the chief effect of operating above this range is to drastically change the selectivity of the absorbent for $H_2S$ and allow the absorption of $CO_2$ in preference to $H_2S$ with resulting substantial diminution of the $CO_2$ content of the treated gas stream. In one important aspect, the present invention involves an improvement in a method for scrubbing $H_2S$ from the gas stream containing $H_2S$ and $CO_2$ wherein it is desired to selectively remove $H_2S$ without substantially effecting the $CO_2$ content of the input gas stream and wherein the aqueous absorbent utilized contains sodium sulfite. The improvement of the present invention in this last case involves the operation of the absorption step under sodium thiosulfate production conditions, including a pH selected from the range of about 6 to 7 selected to yield sodium thiosulfate without the production of elemental sulfur and other undesired by-products.

The removal of $H_2S$ from the gas stream is a problem that has long confronted and challenged workers in many diverse industries. One example is in the natural gas industry where the $H_2S$ content of many gas streams recovered from natural gas deposits in many areas of the world is often too high for commercial acceptance in the principal markets for natural gas. Another example is associated with the manufactured gas industry or the coke-making industry where coal gas containing unacceptable amounts of $H_2S$ is commonly produced by the destructive distillation of bituminous coal having a high sulfur content. Other examples are found in industries where water gas, synthesis gas or synthetic natural gas are manufactured from sulfur-containing coal, coke, or hydrocarbon charge stocks by a reaction with steam at high temperature.

This problem of $H_2S$ removal from a gas stream is also frequently encountered in the petroleum industry because the principal raw material used, crude oil, typically contains a minor amount of sulfur in the form of organic sulfur compounds. During the course of the many hydrocarbon conversion processes to which the crude oil, or fractions thereof, is subjected in a modern petroleum refinery, one or more gas streams containing $H_2S$ are quite commercially produced. For example, in many cases one of the principal product streams from a hydrocarbon conversion process is a gas stream containing $H_2S$ in admixture with hydrogen and/or with light normally gaseous hydrocarbons — mainly, $C_1$ to $C_3$. As is well known in the art, the presence of $H_2S$ in these refinery gas streams cause a number of detrimental problems in subsequent processing steps using these refinery gas streams such as: corrosion of process equipment, deterioration and/or deactivation of hydrocarbon conversion catalysts, undesired side reaction, increases in process pressure requirements with consequential requirement for stronger and heavier vessels and pipes, increases in gas compressor requirements, and the like problems.

With the advent of renewed interest in making synthetic natural gas from sulfur-containing feed stocks, attention has been refocused on the problem of eliminating the $H_2S$ by-product from the product gas stream of such a process in order to meet pipe line and use specifications for high quality natural gas streams. The capability to use feed stocks containing substantial amounts of sulfur for the production of synthetic natural gas can provide a significant economic advantage for this type of process if simple and convenient means for removal of $H_2S$ from the product gas stream or from an intermediate gas stream are readily available and/or if non-sulfur-sensitive catalysts for such a process are developed.

Regardless of the source of the gas stream containing $H_2S$, the problem of removal of $H_2S$ therefrom has been solved in the prior art in the number of different ways which generally involve one or more of the following techniques: (1) selective absorption of $H_2S$ into a wide variety of liquid absorbents, (2) adsorption on a suitable solid adsorbent such as activated charcoal, silica gel, nickel oxide, alumina, crystalline aluminosilicates, etc., with eventual conversion of the adsorbed $H_2S$ into a readily removable sulfur-containing product; and (3) selective reaction of $H_2S$ with a suitable chemical reagent which produces an easily separable sulfur-containing product. The general details of all of these techniques as they have been applied to the $H_2S$ removal problem are well known to those skilled in the art and will not be reviewed here except to note for purposes of examples the most widely practiced $H_2S$ removal processes is the Girbotol processes which uses an aqueous absorbent containing either monoethanolamine, diethanolamine, or triethanolamine to absorb the $H_2S$ from the gas stream with regeneration of the rich absorbent by steam stripping. It is typically employed on the purification of gas streams produced in the natural gas industry and in the petroleum refining industry because the absorbent is very easy to regenerate and it permits very high efficiencies of $H_2S$ removal to be achieved at rather low absorbent loadings.

When the gas stream to be purified not only contains $H_2S$ but also $CO_2$ the problem of $H_2S$ removal becomes greatly compounded and complicated because $CO_2$ forms a stronger acid than $H_2S$ and tends to be selectively absorbed into a basic absorbent solution in preference to $H_2S$ if the absorbent is allowed to remain in contact with the gas stream for a period of time sufficient to establish equilibrium. Thus the general rule in the gas treating art has become that if the input gas stream contains substantial amounts of carbon dioxide then conventional alkaline absorbents cannot be used to remove $H_2S$ from this gas stream. Responsive to the need for the method of selectively removing $H_2S$ from the gas stream in the presence of $CO_2$ the art has developed a number of alternative approaches which can be used to solve this problem. One general procedure depends for its effectiveness on the fact that $H_2S$ has a much greater rate of solution in an alkaline absorbent than does $CO_2$ and if the absorption step is conducted under non-equilibrium conditions in a manner such that the gas stream is only in contact with the absorbent stream for a relatively short period of time (i.e., relative to the time for an equilibrium condition to be established) then some selectivity for $H_2S$ can be obtained if large amounts of $H_2S$ can be tolerated in the treated gas stream. An example of this approach to the solution of the problem is the phosphate process wherein the absorbent solution contains a relatively large amount of tripotassium phosphate. The principal disadvantages associated with this first approach to the solution of the problem are that it cannot in general be used to achieve a high purity treated gas stream and that it can only be used with great difficulty to treat an input gas stream which contains a substantially greater amount of $CO_2$ than $H_2S$. A second approach to the solution of this $H_2S$ removal problem in the presence of $CO_2$ that has been practiced in the prior art is to selectively adsorb $H_2S$ on an adsorbent such as a molecular sieve having a high affinity for $H_2S$. An example of this second type of solution to the so-called "dry-box" process for removing $H_2S$ from coke oven and other $H_2S$ and $CO_2$-containing gas streams. The absorbent used in this last process is hydrated iron oxide dispersed or supported on a suitable carrier material. The principal disadvantage associated with all of these adsorbent solutions to the problem is the attendant requirement for either regeneration or disposal of the adsorbent once it has become saturated with $H_2S$ and the mechanical difficulties associated with maintaining the adsorption efficiency at a high level while performing an adsorption operation on a continuous basis. The final type of solution to this problem that has been disclosed in the prior art involves the use of an oxidizing agent in the adsorbent solution in order to selectively oxidize the adsorbed $H_2S$ to sulfur or an oxysulfur compound. This last approach has the overall effect of significantly increasing the solubility of the $H_2S$ in the adsorbent due to the relatively quick conversion of the absorbed species to a species which does not effect the absorption equilibrium. Examples of oxidizing agents that have been proposed for this type of service are potassium permanganate, sodium dichromate, zinc sulfate, sodium vanadate and the like oxidizing agents. The principal disadvantages associated with this last technique is that generally the oxidizing agents that have been suggested in the prior art are relatively expensive and must be continuously regenerated and reused or only used in the treatment of gas streams containing relatively small amounts of $H_2S$.

Against this background, the problem addressed by the present invention is to provide a simple, effective, efficient and economical method for removal of $H_2S$ from a gas stream containing substantial amounts of $CO_2$ without substantially effecting the $CO_2$ content of the gas stream.

As a result of my investigations directed toward the study of interaction of $SO_2$ and $H_2S$ in an aqueous solution to form thiosulfate, I have now found a solution to this problem which meets all of the stated requirements. In essence, the solution involves using a relatively inexpensive, widely available oxidizing agent in an aqueous absorbent coupled with a technique for operating the absorption step in a highly effective manner to selectively make a sulfur-containing product which is soluble in the rich absorbent stream and possesses substantially commercial utility in its own right or which can easily be converted to elemental sulfur, $H_2S$ or sulfuric acid by subsequent processing steps. The key feature of my solution to this $H_2S$-removal problem involves the concept of using a water-soluble sulfite compound as an oxidizing agent to selectively react with absorbed $H_2S$, under carefully selected conditions including a critical pH range, to selectively form the corresponding thiosulfate compound. A specific example of my solution would involve using sodium sulfite as an oxidizing agent and the selection of operating conditions to selectively produce sodium thiosulfate in the rich absorbent solution without forming any amounts of undesired elemental sulfur by-products and without affecting the $CO_2$ content of the treated gas stream.

The critical operating condition associated with any method is the pH of the aqueous absorbent stream. In order to selectively make thiosulfate it must be maintained in a range of about 6 to about 7. Also careful adjustment of the ratio of hydrogen sulfide to oxidizing agent charged to the absorption zone is necessary in order to insure that the oxidizing agent is present in an amount in excess of that stoichiometrically necessary for the formation of thiosulfate on the basis of the charged hydrogen sulfide. The criticality of this pH range is evident when attempts are made to operate above or below it. Operations above this range result in substantial absorption of $CO_2$ into the absorbent solution with consequent decrease in selectivity of the absorbent for $H_2S$, reduction in the amount of $CO_2$ present in the treated gas stream and marked increase in the amount of $H_2S$ present in the treated gas stream. Attempts at operating below this pH range result in the substantial production of elemental sulfur with the resulting problem of clogging of the absorption zone as is explained hereinafter. The principal advantages associated with my solution are: (1) capability to selectively remove $H_2S$ from relatively rich $CO_2$-containing gas stream; (2) use of a relatively cheap, widely available oxidizing agent; (3) operations are conducted at relatively low temperature and relatively mild pressures; (4) no catalyst is required; (5l) principal product is useful per se or readily convertible into any desired form of sulfur; (6) absorbent is easily regenerated if desired; (7) basic oxidation reaction is extremely fast and quick and easy to control; (8) $H_2S$ removal efficiencies of 98 to 99% or more can be obtained; (9) no solid by-products such as elemental sulfur are made so that absorption equipment is not clogged with solids and maintenance problems are minimized; (10) $CO_2$ content of input gas stream is not substantially changed; (11) no costly mechanical system such as a swing-bed adsorption system with appropriate regeneration facilities are necessary for implementation; and (12) selectivity for desired thiosulfate product can be as high as 90% or more of the $H_2S$ absorbed.

Of all of the advantages of my method listed above perhaps the most important from the practical mechanical point of view is the fact that elemental sulfur is not produced in the absorption system. In the prior art there are disclosed processes (i.e., U.S. Pat. No.

3,446,595) where $H_2S$ is scrubbed from a gas stream with an absorbent containing a bisulfite oxidizing agent under conditions designed to oxidize the absorbed sulfide directly to sulfur in the absorption zone. The presence of elemental sulfur in the absorption zone has two rather distinct disadvantages. The first involves the fact that it is ordinarily preferred to run the absorption zone at a relatively low temperature in order to facilitate the solubility of $H_2S$ in the absorbent and consequently the elemental sulfur which is produced becomes at least in part colloidally dispersed in the absorbent and is extremely difficult to remove therefrom by subsequent methods of separating a solid from a liquid such as filtration and/or centrifuging. As a consequence substantial amounts of elemental sulfur gradually deposit absorption zone and after a period of time it becomes necessary to remove same from the system by appropriate maintenance operations. This problem of sulfur deposition is a particularly acute one when attempts are made to operate such a system in a closed-loop fashion (i.e., with continuous absorbent regeneration and recirculation). The other disadvantage associated with this sulfur deposition problem essentially involves the fact that the precipitated sulfur accumulates in the absorption tower which is generally fitted with suitable means for effecting intimate contact between a gas stream and a liquid stream such as baffles, bubble-trays, perforated plates and conventional packing materials. Essentially the precipitated sulfur clogs the gas and liquid channels through the absorption zone to the point where the pressure drop through the zone increases rather substantially. This causes the cost of forcing large volumes of the input gas stream through the absorption zone to increase rapidly with eventual requirement for shutting down the operation of the absorption zone and removing the precipitated sulfur. Since by use of my method it is possible to obtain very high selectivities for a thiosulfate product with attendant minimization of elemental sulfur by-products, these maintenance problems are essentially eliminated.

It is, accordingly, an object of my invention to provide a simple and straight forward method for removing $H_2S$ from the gas stream containing $H_2S$ and $CO_2$ without producing any substantial amounts of elemental sulfur and without affecting the $CO_2$ content of the gas stream. Another object is to provide a method of this type which is equally effective when the gas stream contains large amounts of $CO_2$ relative to the amount of $H_2S$ or when the stream contains large amounts of $H_2S$ relative to the amount of $CO_2$. Yet another object is to provide a method of this type in which the rich absorbent solution can be easily regenerated with the ultimate recovery of the available sulfur in the form of elemental sulfur, hydrogen sulfide or sulfuric acid as desired.

In brief summary, the present invention is a method for removing $H_2S$ from a gas stream containing $H_2S$ and $CO_2$ without substantially affecting the $CO_2$ contents of the gas stream and without forming elemental sulfur. The method essentially involves contacting the gas stream in an adsorption zone with an aqueous absorbent stream containing a water-soluble sulfite compound at thiosulfate production conditions, including a pH selected from the range of 6 to about 7, selected to form a treated gas stream which is substantially reduced in $H_2S$ content and a rich absorbent stream which contains a thiosulfate compound and is substantially free of elemental sulfur.

Another embodiment of the instant method involves a method as delineated above in the first embodiment wherein the mole ratio of hydrogen sulfide to sulfite compound charged to the absorption zone is less than 0.5:1.

Yet another embodiment involves a method as outlined above in the first embodiment wherein the aqueous absorbent stream contains a mixture of a water-soluble sulfite compound and a water-soluble bisulfite compound in amounts sufficient to result in a mole ratio of sulfite to bisulfite of about 0.5:1 to about 5:1.

A more limited embodiment of the present invention involves a method for removing $H_2S$ from the gas stream containing a minor amount of $H_2S$ and a major amount of the $CO_2$ without substantially effecting the $CO_2$ content of the gas stream and without forming elemental sulfur. The method comprises contacting the gas stream in an absorption zone with an aqueous absorbent stream containing a mixture of sodium sulfite and sodium bisulfite in amounts corresponding to the mole ratio of sulfite to bisulfite of about 0.5:1 to about 5:1. The contacting is performed at thiosulfate production conditions including a pH of about 6 to about 7, a temperature of about 20° to about 150° C., a mole ratio of hydrogen sulfide to total sulfite contained in the absorbent solution of less than 0.5:1 and a pressure sufficient to maintain the absorbent stream in the liquid phase. The conditions are selected from the stated ranges to form a treated gas stream substantially reduced in $H_2S$ content and a rich absorbent stream which contains sodium thiosulfate and which is substantially free of elemental sulfur.

Other embodiments to the present invention encompass further details about particular types of input gas streams that can be treated therein, preferred kinds of oxidizing agents and amounts of oxidized agents, the preferred mechanics for performing the desired gas-liquid contacting step, methods of regenerating the rich absorbent solution if desired and preferred and essential operating conditions. These details are hereinafter disclosed in the following detailed discussions of each of the principal elements of the present invention.

The input gas stream to the method of the present invention contains a mixture of $H_2S$ and $CO_2$. These may be the only ingredients present in the stream or other additional ingredients may also be present such as low molecular weight hydrocarbons, inert gases such as nitrogen, water vapor, carbon dioxide, hydrogen, carbon monoxide and any of the other ingredients found in the commonly available gas streams of this type. The input gas stream may be derived from any one of the different sources known to produce this type of stream and may in particular be a coal gas, an oil gas, a water gas, a natural gas, a refinery gas, a synthetic natural gas, an $H_2S$ stripper overhead gas and the like gas streams. In order to avoid confusion, some of the various types of gas streams which can be charged to the present method are defined as follows: (1) coal gas is a mixture of gases produced from the distructive distillation of coal; (2) oil gas is a gas derived from petroleum by the interaction of oil vapors and steam at high temperatures; (3) water gas, or synthetic gas as is sometimes called, a gas made by decomposing steam by passing it over a bed of incondencent coke or coal, and in some cases it is made by the high temperature reduction of steam with natural gas or similar hydrocarbons; (4) natural gas ia a mixture of low molecular weight hydrocarbons — "typically $C_1$ to $C_4$ hydrocarbons"; (5) refinery gas is a mixture of low molecular weight hydrocarbons and/or hydrogen produced in converting and distilling hydrocarbons in a modern petroleum refinery; (6) synthetic natural gas is a methane-rich gas which is typically made by the high temperature reaction of steam with hydrocarbons boiling in the gasoline range followed by a methane enrichment reaction; and (7) $H_2S$-stripping overhead gas is a mixture of $CO_2$ and $H_2S$ which is produced in a stripping zone designed to strip $H_2S$ out of an aqueous solution with a $CO_2$-rich stripping gas. The amount of $H_2S$ contained in the input gas stream may range from about 0.01 mole % up to about 50 mole % or more, and typically will be in the range of about 1 to about 15 mole %. Likewise, the amount of $CO_2$ in the input gas stream may range from about 0.01 mole % up to about 50 mole % or more, and typically will be in the higher end of this range that is about 25 to about 50 or more mole % of the input gas stream. For example, I have obtained excellent results with a gas stream comprising 78% $CO_2$ and 12% $H_2S$. The ratio of $CO_2$ to $H_2S$ contained in the input gas stream is not a highly pertinent parameter for the method of the present invention because my procedure is operative over an extremely broad ratio range, but I have obtained excellent results with gas streams having a ratio of $CO_2$ to $H_2S$ varying between 3:1 to 20:1.

The aqueous absorbent used in the method of the present invention is generally characterized as an aqueous solution containing a water-soluble sulfite compound. Generally the water-soluble sulfite compound is either ammonium sulfite, one of the alkali metal sulfites or one of the water-soluble alkaline earth metal sulfites. Generally best results are obtained when the sulfite compound is ammonium sulfite or sodium sulfite or potassium sulfite. It is to be noted that the scope of the present invention is intended to include mixtures of the sulfite compounds previously mentioned. In addition, mixtures of the bisulfite and sulfite salts of ammonia, the alkali metals and alkaline earth metals may be utilized in the absorbent stream provided that the pH of the absorbent is adjusted to result in a pH within the critical range of about 6 to about 7. This may be accomplished either by adjusting the relative amounts of the sulfite and bisulfite compounds or by the addition of a suitable buffering agent such as the normal or acid salts of relatively weak acids or by any other suitable method known to those skilled in this art. In general, good results are obtained when the absorbent stream contains a mixture of a water-soluble sulfite compound and a water-soluble bisulfite compound in amounts sufficient to result in a mole ratio of sulfite to bisulfite of about 0.5:1 to about 5:1, with best results obtained at a mole ratio of 1:1. The most preferred oxidizing agent for use in the absorbent stream is sodium sulfite and best results are ordinarily obtained in the sodium system with an absorbent containing a mole ratio of sodium sulfite to sodium bisulfite of about 0.5:1 to about 5:1, with the optimum preference being a mole ratio of 1:1. The total amount of the sulfite oxidizing agent contained in the aqueous solution is generally sufficient to constitute about 1 to about 15 wt. % of the absorbent solution, although solutions containing an amount of the oxidizing agent up to the solubility limit of the particular oxidizing agent in water at the conditions maintained in the absorption zone can in many cases be utilized. Excellent results are obtained with an absorbent stream containing about 3 wt. % sodium bisulfite and about 9 wt. % sodium sulfite.

The step of contacting the input gas stream with the aqueous absorbent stream can be carried out in any conventional manner for efficiently contacting a gas stream with a liquid stream. This contacting operation can be performed in one or more stages comprising the absorption zone according to any of the absorption techniques taught in the art. The input gas stream and the absorbent stream can be passed into the absorption zone in either concurrent or countercurrent manner. Ordinarily the absorption zone will contain suitable means for effecting contact between the gas stream and the absorbent stream such as bubble cap plates, perforated trays, baffles, conventional packing materials (for example — broken rock, coke, stoneware, Raschig rings, Berl saddles, etc.) and the like contacting means which provide a large gas-liquid contact area and achieve distribution of the gas throughout the zone. In addition mechanical mixers or other like devices may be employed in the absorption zone to increase reaction rates by reducing gas bubble sizes and to improve gas distribution within the absorption zone. The gas stream may be introduced at multiple injection points spaced along the direction of flow of the liquid stream through the zone in order to further promote intimate contact of the gas stream with the aqueous absorbent solution. Likewise, the absorbent stream may be introduced at a plurality of injection points. In a concurrent flow mode of operation the input gas stream and the lean absorbent stream are preferably introduced into the bottom of the suitable gas-liquid contacting zone and the treated gas stream and the rich absorbent stream are withdrawn from the top of the zone with separation of the gas from the absorbent either occurring in the top of the absorption zone or in a separate gas-liquid separating zone which receives the total effluent from the absorption zone. In another concurrent flow type of embodiment, the input gas stream and the lean absorbent stream are admixed and passed downwardly into the absorption zone, with separation of the treated gas stream from the rich liquid absorbent stream either occurring in the bottom of the absorption zone by means of the suitable baffling arrangement or in a separate conventional gas-liquid separating zone which receives the total effluent from the bottom of the absorption zone. The most preferred mode of operation for this absorption step is a conventional countercurrent type of operation wherein the input gas stream is introduced into a vertically positioned contacting zone containing suitable means for effecting intimate contact between a decending liquid stream and an ascending gas stream. The lean absorbent solution is introduced into the top of the absorption zone in this last mode of operation and the rich absorbent stream is withdrawn from the lower region thereof. Conversely, the input gas stream is introduced into the bottom of the zone and the treated gas stream is withdrawn from the upper region from the absorption zone in this last mode of operation of the absorption step. It is to be noted that the method of the present invention does not produce any substantial amount of elemental sulfur by-products; therefore, the problem of avoiding the precipitation of elemental sulfur in the absorption zone is eliminated.

The conditions maintained in the absorption zone are generally characterized as thiosulfate formation conditions. The temperature utilized in the absorption step is selected from the range from about 20° to about 150° C., with a preferred value being about 25° to about 100° C. Ordinarily, superior results are obtained at relatively lower temperatures because the low temperature in the absorption zone facilitates the absorption $H_2S$ into the absorbent solution even though it does cause some significant decrease in the thiosulfate reaction rate. The pressure used can in general be any pressure sufficient to maintain the absorbent solution in a liquid state, with a pressure of about 10 to about 500 psig being adequate in most cases. It is of course to be realized that superior results are obtained at higher pressure simply because high pressure increases the solubility of $H_2S$ in the absorbent solution; however, this effect is small and pressure requirements are usually dictated by the pressure at which the input gas stream is available. Another relevant parameter for this absorption step is the contact time of the input gas stream with the liquid absorbent. This parameter is rather difficult to calculate for a continuous absorption operation as it is a function of the gas to absorbent circulation rate, the void spaces in the absorption zone, the degree of dispersion of the gas in the absorbent, the bubble size of the gas in the tower and other like factors well known to those skilled in the design of absorption zones. As a general rule, I have found that the thiosulfate production reaction is extremely fast under the conditions of temperature and pressure hereinbefore stated, with good results obtained in as little as 0.01 hours although I prefer to use somewhat longer contact times in order to insure that the reaction has adequate time to go to completion. Thus, contact times of about 0.01 to about 1 or more hours can be utilized in the method of the present invention. The most important condition controlling the course of the reaction in the absorption zone is the pH of the absorbent stream entering the zone. My finding here is that it is essential that this pH may be maintained within the range of about 6 to about 7, with best results obtained in the range of about 6.3 to about 6.7. As hereinbefore explained, attempts at operating below this range result in the production of undesired solid elemental sulfur with attendant problem of precipitation of elemental sulfur in the absorption equipment. Likewise, operations above this range rapidly shift the selectivity of the absorbent toward absorption of carbon dioxide with corresponding increases in the amount of $H_2S$ remaining in the treated gas stream.

The efficiency of the $H_2S$ absorption step is dependent on a large number of factors. The expression "efficiency of the absorption operation" is used herein to mean the percent of $H_2S$ charged to the absorption step that is removed therein per unit time. For a particular case, some of the factors that govern the efficiency that can be achieved by my method are: the $H_2S$ content of the input gas stream, the concentration of the sulfite oxidizing agent in the absorbent, the mass transfer efficiency of the absorption zone, the ratio of gas to absorbent entering the absorption zone per unit time that is the mole ratio of sulfide to sulfite charged to the absorption step and the exact conditions utilized. My method is capable of removing greater than 99% of the $H_2S$ charged thereto if the specific operating conditions are properly selected. For example, the experiment reported in Example 1 shows 99.6% of the $H_2S$ charged to the zone was converted therein to sodium thiosulfate. The most important factor governing the efficiency of the absorption operation is the ratio of hydrogen sulfide to sulfite entering in the zone. For an absorption step that operates with a conventional, highly efficient type of gas-liquid contacting means this ratio should be maintained less than 0.5:1 in order to insure that the sulfite oxidizing agent is stoichiometrically in excess of the hydrogen sulfide charged to the zone. The reaction between hydrogen sulfide and a sulfite compound to produce the corresponding thiosulfate compound, assuming perfect contact of gas with the liquid, requires 0.5 moles of $H_2S$ per mole of sulfite compound. As a practical matter I have found excellent results when this ratio is set in the range of about 0.05:1 to about 0.4:1 so that an amount of unreacted sulfite compound is allowed to appear in the rich absorbent stream. As is well known to those skilled in the art, for a particular input gas stream, lean absorbent stream and adsorption zone, the efficiency of the absorption step is controlled by adjusting the circulation rate of gas to liquid absorbent to achieve the desired reduction in $H_2S$ content in the input gas stream. Ordinarily for most specific applications of the present method, the gas to liquid ratio is selected from the range of about 50:1 to about 5000:1 in order to achieve the target efficiency. The exact ratio to be used in the given case can either be calculated from the specific mass transfer characteristics of the type of absorption tower utilized or determined by a series of simple experiments as is well known to those skilled in the art.

The treated gas stream withdrawn from the contacting step will be substantially reduced in $H_2H$ content — typically 90 to 99% or more of the $H_2S$ content thereof is removed by my method. It can typically be vented without causing a major pollution problem. Alternatively, in the case where the input gas stream contained large amounts of $CO_2$, the treated gas stream constitutes an excellent stripping gas for an $H_2S$ stripping step.

The rich absorbent stream withdrawn from the absorption step is found to contain relatively large amounts of the corresponding thiosulfate compound and to be essentially free of elemental sulfur. In most cases, it will also contain a minor amount of unreacted sulfite compound. For example, in the case where sodium sulfite is used as the oxidizing agent, the rich absorbent stream will contain a mixture of sodium thiosulfate and sodium sulfite. This rich absorbent stream can be subjected to a suitable operation designed to recover crystals of the thiosulfate product therefrom such as by chilling same or by subjecting it to a suitable evaporating step. The thiosulfate compounds are valuable industrial commodities. Sodium thiosulfate for example, is used in fixing baths in photography, in the manufacture of chrome leather, as an antichlor in the textile and paper industry, in the extraction of silver from ores, in gold and silver plating baths as a bleach for various materials, as a preservative against fermentation and other well known uses. If the economics of the particular case do not favor the recovery of the thiosulfate value from the rich absorbent solution, it can in many cases be discharged into a suitable sewer without causing a major pollution problem because it has only a minor biochemical oxygen demand. On the other hand, if it is desired to regenerate the absorbent stream, the thiosulfate compound contained therein can be reduced by suitable reducing agents such as hydrogen, carbon monoxide, a water-soluble sulfide compound, hydrocarbons and the like reducing agents to either elemental sulfur or to hydrogen sulfide. The sulfur products of the regeneration step can then be used to produce any of the sulfur-containing products that are useful to industry such as sulfuric acid by methods well known to those skilled in the art.

The following examples are presented to demonstrate the significant benefits associated with the method of the present invention in specific cases. These examples are of course intended to be illustrative rather than restrictive.

EXAMPLE I

An experiment was performed where an input gas stream which contained 94 mole % and 6 mole % $H_2S$ was continuously contacted in a conventional gas-liquid absorption zone with an aqueous absorbent stream containing 1.64 wt. % sulfur as $Na_2SO_3$. The absorption zone was a conventional countercurrent design having an inlet port for the input gas stream and an outlet port for the rich absorbent in the lower region thereof and an exit port for the treated gas stream and an inlet port for the aqueous absorbent in the upper region thereof. The absorption zone contained a fixed bed of packing material comprising relatively small stainless steel helices. The conditions maintained in the absorption zone were: (1) a pH of the lean aqueous absorbent entering the zone of 6.75, a temperature of 55° C., pressure of 50 psig and a gas to liquid circulation ratio sufficient to result in a mole ratio of sulfite to $H_2S$ introduced into the zone per unit time of 0.119:1. Results for a 4 hour test run indicated that 99.6% of the $H_2S$ charged to the zone was converted therein to sodium thiosulfate. Likewise 38% of the sodium sulfite charged to the zone was converted therein. The treated gas stream withdrawn from the top of the zone was found to contain less than 250 vol. ppm of $H_2S$ throughout the test. The rich absorbent was free of elemental sulfur throughout the test period.

EXAMPLE II

Example 1 was repeated except that the gas to liquid circulation rate was changed to a value corresponding to a mole ratio of sodium sulfite to hydrogen sulfide introduced into the zone of 0.244:1. The result of this experiment showed that once again the treated gas stream contained less than 250 vol. ppm of $H_2S$ throughout the test and that 99.8% of the $H_2S$ charged to the zone was converted therein to sodium thiosulfate. Likewise, analysis of the rich absorbent showed that 63% of the sodium sulfite was converted in the absorption operation and that essentially no elemental sulfur was formed.

EXAMPLE III

A gas stream comprising 93 mole % $CO_2$ and 7 mole % $H_2S$ is charged to the lower region of the vertically positioned absorption zone. The absorption zone is a conventional liquid-gas contacting vessel containing suitable means for effecting intimate contact between an ascending gas stream and a descending absorbent stream. The absorbent stream utilized is an aqueous stream containing 2.92 wt. % sodium bisulfite and 8.3 wt. % sodium sulfite. The mole ratio of sulfite to bisulfite in the absorbent is about 2.3:1 and the pH of the absorbent entering the zone is maintained at 6.5. The absorbent stream is injected into the upper region of the absorption zone at a point substantially above the feed point for the gas stream and flows downwardly to a liquid outlet port in the bottom of the zone. In contrast, the input gas stream flows from the lower region of the zone to an exit port located in the upper region there whereat a treated gas stream is recovered.

The absorption zone is operated at a bottom temperature of about 50° C. and a pressure of about 55 psig. The rates of circulation of the gas stream and of the absorbent stream through the zone are adjusted to result in a mole ratio of $H_2S$ to sodium sulfite plus sodium bisulfite entering the absorption zone per unit time of about 0.27:1. An analysis of the rich absorbent stream withdrawn from the bottom of the zone indicated that better than 99% of the $H_2S$ charged thereto is converted therein to sodium thiosulfate. Similarly, an analysis of the treated gas stream withdrawn from the upper region of this zone shows it to be essentially pure $CO_2$ with less than 250 ppm. of $H_2S$. The treated gas stream provides an excellent stripping gas for a conventional $H_2S$-stripping operation. Operations are conducted as described for a substantial period of time and it is found that throughout the operating period the rich absorbent stream is substantially free of elemental sulfur and no problems of sulfur deposition in the absorption zone are encountered.

It is intended to cover by the following claims all changes, variations and modifications of the above disclosure of the method of the present invention that would be self-evident to someone of ordinary skill in the gas treating art.

I claim as my invention:

1. A method for removing $H_2S$ from a gas stream containing $H_2S$ and $CO_2$ without substantially affecting the $CO_2$ content of the gas stream, which comprises contacting the gas stream with an aqueous solution of a water-soluble sulfite at a pH of about 6 to about 7, a temperature of about 20° to about 150° C. and a mole ratio of hydrogen sulfide to sulfite of less than 0.5:1, whereby to form a treated gas stream which is substantially reduced in $H_2S$ content and a rich absorbent stream containing a thiosulfate compound and which is substantially free of elemental sulfur.

2. A method as defined in claim 1 wherein said water-soluble sulfite is ammonium sulfite.

3. A method as defined in claim 1 wherein said water-soluble sulfite is an alkali metal sulfite.

4. A method as defined in claim 3 wherein the alkali metal is sodium.

5. A method as defined in claim 3 wherein the alkali metal is potassium.

6. A method as defined in claim 1 wherein the water-soluble sulfite is water-soluble alkaline earth metal sulfite.

7. A method as defined in claim 1 wherein the mole ratio of hydrogen sulfide to sulfite charged to the contacting step is in the range of about 0.05:1 to about 0.4:1.

8. A method as defined in claim 1 wherein the pH of said solution entering the contacting step is about 6.3 to about 6.7.

9. A method as defined in claim 1 wherein said aqueous solution contains a mixture of a water-soluble sulfite and a water-soluble bisulfite in a mole ratio of sulfite to bisulfite of about 0.5:1 to about 5:1.

10. A method as defined in claim 9 wherein the mole ratio of sulfite to bisulfite is 1:1.

11. A method as defined in claim 1 wherein the contacting is effected at a temperature of about 25° to about 100° C. and a pressure of about 10 to 500 psig.

12. A method for removing $H_2S$ from a gas stream containing a minor amount of $H_2S$ and a major amount of $CO_2$ without substantially affecting the $CO_2$ content of the gas stream, the method comprising contacting the gas stream in an absorption zone with an aqueous solution of sodium sulfite and sodium bisulfite in amounts corresponding to a mole ratio of sulfite to bisulfite of about 0.5:1 to about 5:1, said contacting being performed at a pH of about 6 to about 7, a temperature of about 20° to about 150° C., a mole ratio of hydrogen sulfide to total sulfite of less than 0.5:1, and a pressure sufficient to maintain the absorbent stream in the liquid phase, whereby to form a treated gas stream substantially reduced in $H_2S$ content and a rich absorbent stream which contains sodium thiosulfate and which is substantially free of elemental sulfur.

13. A method as defined in claim 12 wherein the pH of said solution entering the absorption zone is in the range of about 6.3 to about 6.7.

* * * * *